Patented Oct. 21, 1924.

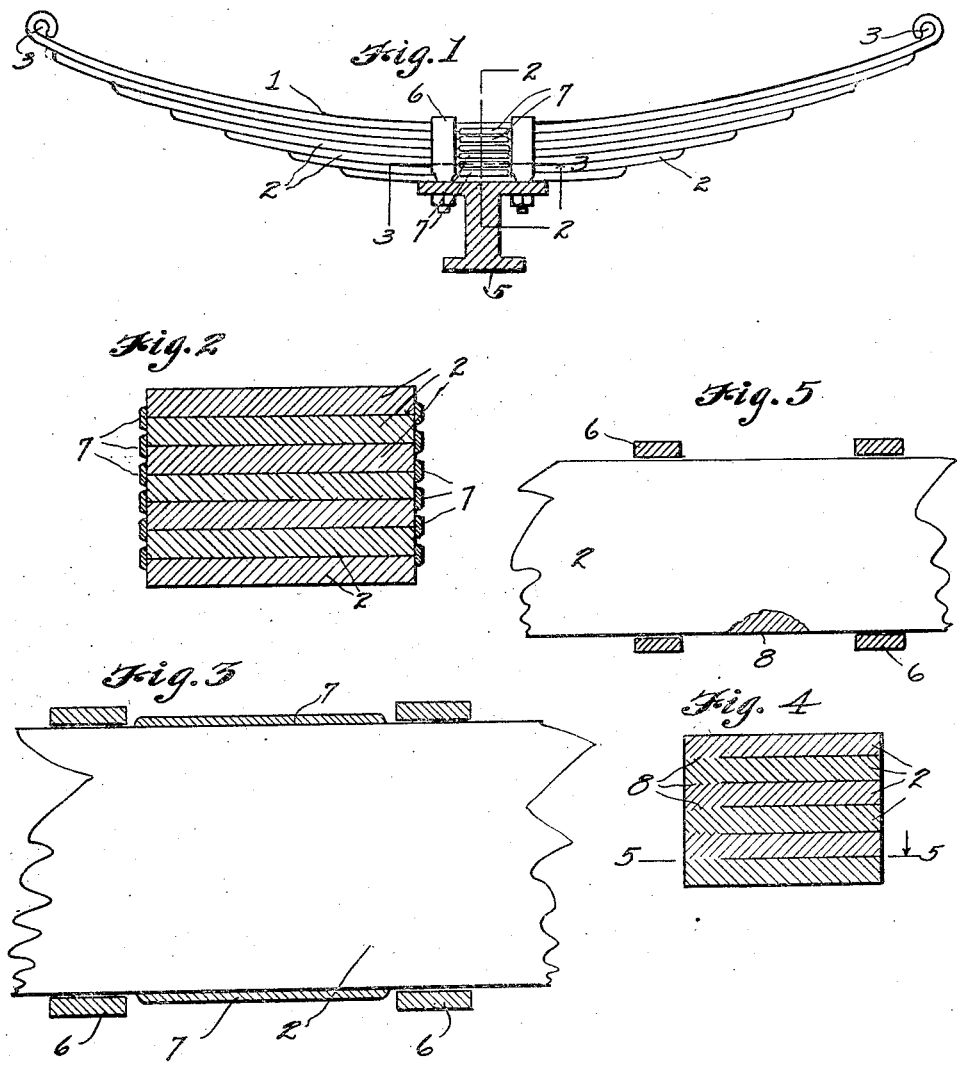

1,512,109

UNITED STATES PATENT OFFICE.

FRANK J. LAHER, OF SEATTLE, WASHINGTON.

VEHICLE SPRING.

Application filed February 16, 1922. Serial No. 536,965.

*To all whom it may concern:*

Be it known that I, FRANK J. LAHER, a citizen of the United States, and a resident of the city of Seattle, county of King and State of Washington, have invented certain new and useful Improvements in Vehicle Springs, of which the following is a specification.

My invention relates to vehicle springs, and more particularly to improvements in springs of that class known as laminated springs, and wherein a plurality of leaves are arranged in superimposed relation; the principal object of the invention being to provide a method whereby the several leaves of a spring may be joined independently together in such manner as to prevent any possible longitudinal shifting relative to each other, and whereby a broken leaf of the spring may be replaced without endangering the weld of the adjacent leaves.

Heretofore various means and methods have been employed for retaining the leaves of such springs in functional relation; the most common means being the extending of bolts through the leaves at the center of the spring, but this method, as well as some of the others, tends to weaken the spring and, for this reason, is not desirable.

It is, therefore, a further object of this invention to provide a method of joining the leaves of laminated springs in a manner that will retain them in proper functional relation without in any way weakening, or lessening, the efficiency of the spring and whereby the spring may be held against displacement on its support.

In accomplishing these and other objects of the invention, I have provided the improved details of construction, the preferred forms of which are illustrated in the accompanying drawings, wherein—

Figure 1 is a side view of a spring wherein the leaves are joined in accordance with the provisions of the present invention.

Figure 2 is an enlarged, transverse, sectional view of the same, taken on the line 2—2 of Figure 1, illustrating particularly the lugs welded to the leaves to join the latter.

Figure 3 is a section taken on the line 3—3 in Figure 1, illustrating the extent of the welding between the leaves.

Figure 4 is an enlarged detail view, illustrating an alternative method of joining the leaves of a spring.

Figure 5 is a sectional view on the line 5—5 in Figure 4.

Referring more in detail to the several views of the drawings—

1 designates a vehicle spring of the most common type, comprising a plurality of superimposed leaves 2; the base leaf of the spring being relatively short and the others, in their order of arrangement thereon, being of gradually increased lengths with the upper leaf equipped at its ends with eyelets 3 for receiving shackle bolts, or other means, not shown, for supporting a body from the spring. This spring is centrally mounted upon an axle 5 and is secured thereto by means of clips as indicated at 6, which extend about the spring and are anchored to the axle.

In order to prevent any possible longitudinal shifting of the leaves relative to each other, I have welded elongated strips, or lugs, of metal 7 to adjacent leaves at the center of the spring. These welds are located between the clips 6 and engage therewith as a means of preventing creeping of the spring on the axle. For the best type of construction these welds would be applied at each side of the spring, but if it is desired, they may be provided only at one side. The length of the lugs may be varied accordingly as is thought necessary; it being required that they be sufficiently strong that they will effectively serve their purpose.

In Figures 4 and 5, I have illustrated an alternative method of joining the leaves, which consists of simply welding adjacent leaves together without applying the lugs 7 thereto. These welds are indicated at 8 and are relatively short in length and depth; it only being required to make the welds of sufficient extent to retain the leaves against slippage, or creeping, as there is no strain on the spring at this point that would tend in any way to pull the leaves apart.

Various methods of welding may be employed, but the most preferable would be by use of an acetylene torch or by electric spot welding. Welding of this character can be easily done and will, in no way, weaken the construction as does the application of bolts to the leaves. On the other hand, it will tend to strengthen the spring and will be more satisfactory, also, for the reason that assembling with the axle and retaining clips is made easier. This method of joining the leaves is applicable to springs of various size and types, for automobiles, trucks or other vehicles.

Having thus described my invention, what I claim as new therein and desire to secure by Letters Patent, is:

A vehicle spring comprising a plurality of superimposed leaves with strips disposed in alinement against the opposite sides of the spring and overlapping the edges of adjacent leaves; said strips being welded to the edges of the leaves in succession to prevent relative longitudinal shifting thereof at the center of the spring and adapted to engage at their ends with a spring mounting means to prevent shifting of the spring.

Signed at Seattle, Washington, this 10th day of February, 1922.

FRANK J. LAHER.